United States Patent [19]

Dasgupta et al.

[11] 3,832,575

[45] Aug. 27, 1974

[54] DATA BUS TRANSMISSION LINE TERMINATION CIRCUIT

[75] Inventors: Sumit Dasgupta, Beacon; David H. Richter, Wappingers Falls; Ted I. Takayesu, Poughkeepsie, all of N.Y.

[73] Assignee: International Business Machines Corporation, Armonk, N.Y.

[22] Filed: Dec. 27, 1972

[21] Appl. No.: 319,097

[52] U.S. Cl. ............. 307/208, 307/237, 307/247 R, 307/251, 307/254, 307/270, 333/32

[51] Int. Cl. ......................... H03k 19/08, H03k 5/08

[58] Field of Search ........ 307/203, 208, 237, 247 R, 307/270, 254, 251; 333/32, 33

[56] References Cited

UNITED STATES PATENTS

| | | | |
|---|---|---|---|
| 3,329,835 | 7/1967 | D'Agostino | 307/203 |
| 3,381,089 | 4/1968 | Delanoy et al. | 307/208 |
| 3,585,399 | 6/1971 | Andrews, Jr. | 307/208 |
| 3,588,622 | 6/1971 | Mankowski, Jr. | 307/208 |
| 3,660,675 | 5/1972 | Andrews, Jr. | 307/208 |

*Primary Examiner*—Stanley D. Miller, Jr.
*Attorney, Agent, or Firm*—Martin G. Reiffin; Julius B. Kraft

[57] ABSTRACT

A data bus transmission line termination circuit for connection either to the terminal end of a data bus or to an intermediate portion of the bus. The circuit is programmable to either a low-impedance state for connection to the terminal end of the data bus so as to provide an optimum terminating load for the bus, or to a high-impedance state for connection to an intermediate portion of the data bus so as not to load down the latter when so connected. The termination circuit is preferably formed on the same integrated circuit chip as the receiver circuit so as to be located adjacent the effective end of the total transmission line including the portion extending from the data bus proper through the connections and conductors of the board, card, module and chip to the receiver circuit on the chip.

26 Claims, 8 Drawing Figures

DATA BUS TRANSMISSION LINE TERMINATION CIRCUIT

BACKGROUND OF THE INVENTION

1. Field of the Invention

This invention relates to a novel data bus transmission line termination circuit such as may be employed in digital computers and other data processing equipment.

2. Description of the Prior Art

Digital computer systems and other data processing and digital communication equipment generally comprise a plurality of physically separated units which must be interconnected so that they may communicate with each other for the transmission of data from each unit to or from one or more of the other units. For example, a typical digital computer system may comprise a central processing unit, a memory, and several input/output units such as a card reader, disk file, and tape unit. The units are interconnected by one or more data buses.

In order to optimize the signal propagation and minimize the noise, each data bus must be carefully designed as a transmission line with approximately matched load terminations. Furthermore, the receiver circuits connected to the data bus must have a minimal effect on the distributed impedance of the bus. That is, the receiver circuits connected to the bus should present a high impedance to the bus so as to minimize current demands on the driving source circuits and reduce attenuation of the signal travelling down the bus.

In conventional systems in accordance with the prior art, the data buses are usually terminated with discrete passive resistors which are individually mounted on the circuit boards. This arrangement is disadvantageous in several important respects.

First, the operation of installing the large number of termination resistors required is expensive and time consuming.

Second, the termination resistors cannot be placed at the proper location adjacent the effective end of the transmission line. That is, the transmission line effectively has two portions: the data bus proper extending to the circuit board, and an additional portion comprising the connections and conductors of the board, card, module and integrated circuit chip on which the receiver circuit is formed. The discrete termination resistors must be mounted on the board and hence are located adjacent the end of the data bus proper, but not adjacent the effective end of the transmission line including said connections and conductors. As a result, the line is improperly terminated, signal reflections and noise present design problems, and optimum performance of the system cannot be achieved.

SUMMARY OF THE INVENTION

It is therefore a primary object of the present invention to provide a novel data bus transmission line termination circuit which obviates the above-noted disadvantages of discrete termination resistors used in the prior art. The termination circuit in accordance with the present invention is an active circuit preferably integrated on the same semiconductor chip with the receiver circuit to which the signal on the data bus is transmitted. The operation of installing a large number of discrete termination resistors is thus eliminated with a substantial saving in time and expense. Perhaps even more important, the integrated active termination circuit may be connected adjacent the effective end of the transmission line, including said connections and conductors associated with the board, card, module and chip, so as to minimize signal reflections and noise and to provide optimum performance of the system.

Another advantage of the termination circuit of the present invention is that the circuit may be programmed, that is, controlled by a signal, so as to present to the line either a high impedance or a low impedance. The former is desirable when the receiver circuit and its respective termination circuit are connected to an intermediate portion of the data bus so that the termination circuit will not load down the bus where a load would prevent proper functioning of the bus. However, when the receiver circuit and its respective termination circuit are connected to the end of the bus, the termination circuit is programmed to its low-impedance state so as to provide the desired load termination at the effective end of the transmission line.

Another advantage of the present invention is that each data bus may be individually programmed for optimum performance with respect to noise, signal reflection and bus recovery. For example, if minimum susceptibility to noise is determined to be particularly important for any bus, more than one termination circuit adjacent the end of the transmission line may be turned "on," that is, programmed to its low-impedance state. As another example, if for any particular line it is determined that switching speed is of paramount importance, then all of the termination circuits connected to that line may be turned "off," that is, programmed to the high-impedance state.

Another important advantage of several embodiments of the termination circuit in accordance with the present invention is that the circuit helps in maintaining the data bus within the range of proper voltage levels when the drive circuits for the bus are "off."

Still another advantage of the present invention is its ability to dampen noise on the data bus. With low-level currents in the termination circuit its noise damping characteristics are at least as good as provided by the discrete passive termination resistors of the prior art. With slightly increased current levels in the termination circuit, the noise damping characteristics are far better than those provided by discrete resistors. However, in the latter event the improved noise damping characteristics are the result of a trade-off which results in slower switching speed.

Other objects and advantages of the present invention are either inherent in the structure and mode of operation described below or will be apparent to those skilled in the art as the detailed description proceeds.

DESCRIPTION OF THE PREFERRED EMBODIMENTS

Digital systems such as computers, data processing equipment and digital communication systems generally comprise a plurality of physically separated units which must be interconnected so that they may communicate with each other to transmit and receive data signals. A typical digital computer system, for example, includes a central processing unit, a memory, and several input/output units such as a card reader, disk file and tape unit. The units are interconnected by one or more data buses.

Each data bus must be carefully designed as a transmission line with approximately matched load terminations in order to optimize the signal propagation and to minimize the noise. For this purpose, each transmission line should be provided at its end with a load termination having an impedance of the same order of magnitude as the characteristic impedance of the line. Furthermore, the receiver circuits which are connected to the data bus so as to receive signals transmitted thereby should not unduly load down the line. More specifically, those receiver circuits connected to the bus should present a high impedance so as to minimize current demands on the driving source circuits and reduce attenuation of the signal travelling down the bus.

Figure 1:
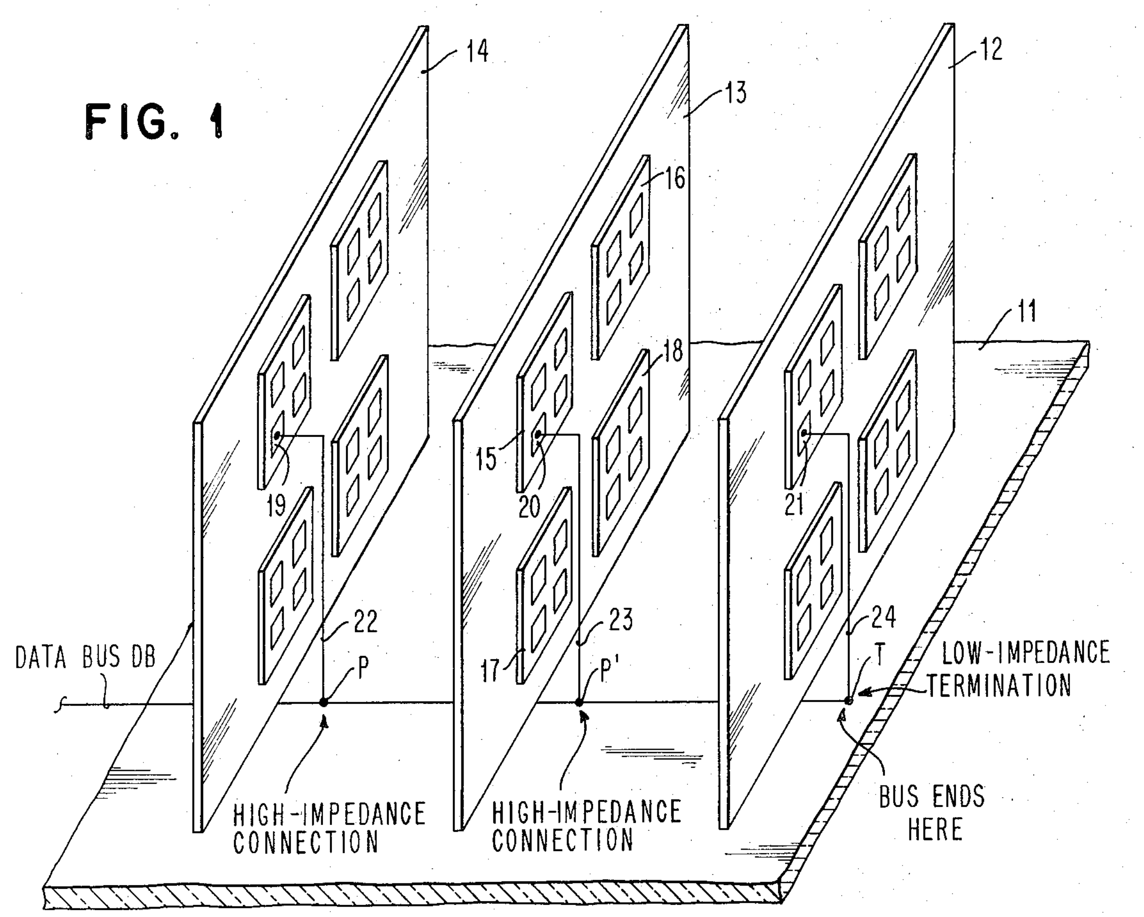
FIG. 1 is a schematic perspective view showing a board having mounted thereon three cards each containing four modules each including four integrated circuit chips, and a data bus having connections at intermediate points thereof to two of the chips and a connection at the end of the bus to a third chip.
Figure 2:
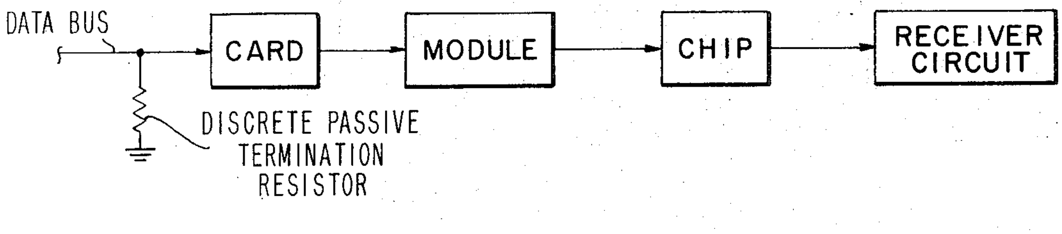
FIG. 2 PRIOR ART
FIG. 2 is a schematic block diagram showing the prior art arrangement wherein a discrete passive termination resistor is connected to the end of the data bus proper with the subsequent connections and conductors of the card, module and chip interposed between the passive termination resistor and the receiver circuit.
Figure 3:
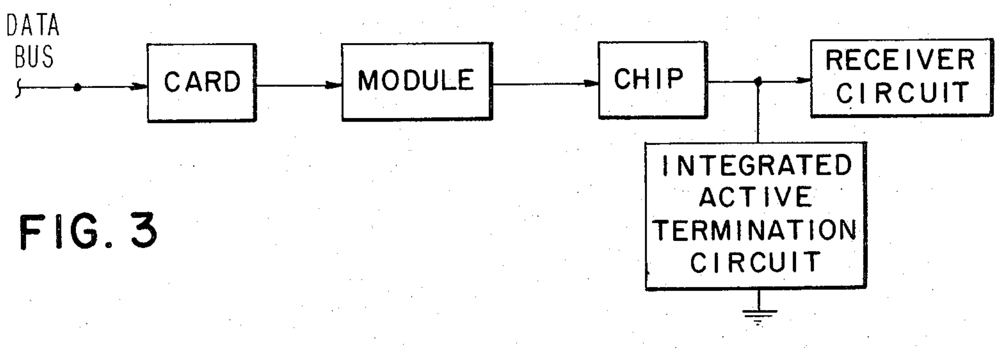
FIG. 3 is a schematic block diagram showing the arrangement in accordance with the present invention wherein an integrated active termination circuit is located adjacent the effective end of the entire transmission line including the connections and conductors of the board, card, module and chip.

These requirements may be understood with reference to FIG. 1 which shows a typical computer board 11 having mounted thereon a plurality of cards 12, 13, 14 each having four modules as at 15, 16, 17, 18. Each module is shown as having four integrated circuit chips as at 19, 20, 21. It will be understood that in actual practice, the board 11 may have many more than three cards and each card may have many more than four modules, etc., and that the respective number of each of the components shown in FIG. 1 is reduced for simplicity and clarity in illustration. A data bus is indicated by the reference designation DB and is connected at an intermediate point P by a conductor 22 to circuit chip 19 and at another intermediate point P' by a lead 23 to an integrated circuit chip 20. The end of data bus DB is also provided with a termination T connected by a conductor 24 to integrated circuit chip 21.

At intermediate connection points P and P' the load presented to data bus DB by conductors 22, 23 and circuit chips 19, 20 should have a relatively high impedance to the bus so as to minimize current demands on the driving source circuits and reduce attenuation of the signal travelling down the bus. However, at the termination T at the end of the data bus, the impedance seen by the bus should have a relatively low impedance of about the same order of magnitude as the characteristic impedance of the transmission line formed by the bus. Ideally, the conductors and connections of the board, card, module and chip, all of which are symbolized by the conductor 24, should be treated as part of the transmission line so that the termination load should be placed on chip 21 adjacent the receiver circuit which receives the signal transmitted by data bus DB. However, with the use of discrete passive resistors for load terminations as heretofore practiced in the prior art, it is necessary to mount the termination resistor on board 11 adjacent the end of data bus DB rather than adjacent the end of the entire transmission line including the connections and conductors of the board, module, card and chip.

FIG. 4 Embodiment

Figure 4:
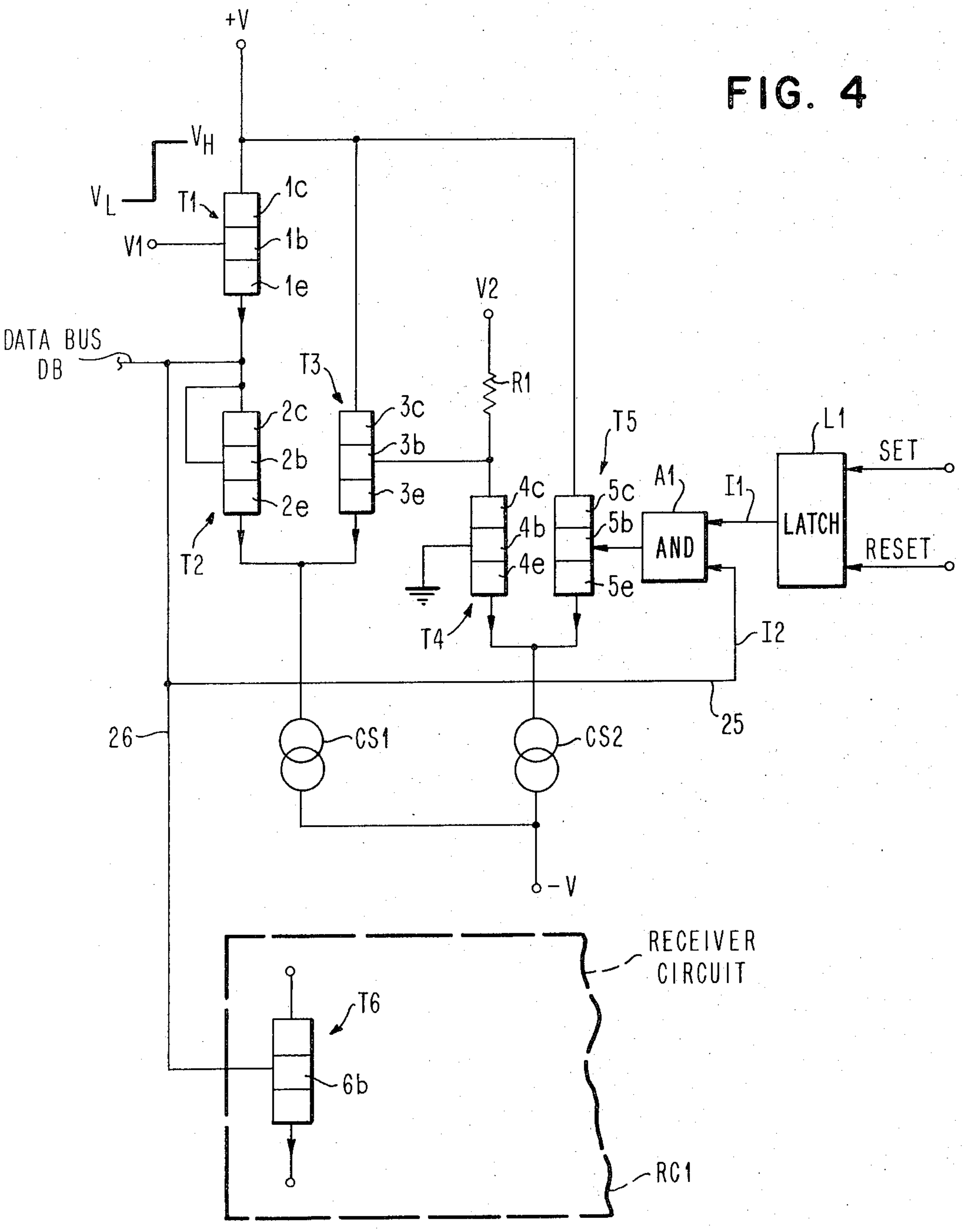
FIG. 4 is a circuit diagram of a preferred embodiment of the transmission line termination circuit in accordance with the present invention.

Referring now to FIG. 4, there is shown a preferred embodiment of a data bus transmission line termination circuit in accordance with the present invention. The circuit comprises a clamping transistor T1, a first current switch including a diode-connected transistor T2 and a transistor T3, a second current switch including transistors T4 and T5, an AND gate A1 and a latch L1. A receiver circuit RC1 is indicated symbolically by the transistor T6.

Clamping transistor T1 comprises a collector 1*c* connected to a power supply terminal +V, a base 1*b* connected to a voltage source V1, and an emitter 1e connected to data bus DB. Transistor T2 of the first current switch comprises a collector 2*c* shorted to its base 2*b* so that transistor T2 is in effect a diode with its emitter 2*e* constituting the cathode. The latter is connected to a substantially constant current source or sink CS1 which may be in the form of either a resistor or a transistor. Transistor T3 of the first current switch has its collector 3*c* connected to a power supply terminal +V and its emitter 3*e* connected to current source CS1. Base 3*b* of transistor T3 is connected to the lower end of a load resistor R1 having its upper end connected to a voltage source V2.

Transistor T4 of the second current switch has its collector 4*c* connected to the lower end of load resistor R1 and its base 4*b* connected to ground as shown. Emitter 4*e* of transistor T4 is connected to a second constant current source or sink CS2 which may also be in the form of either a resistor or a transistor. Both constant current sources CS1 and CS2 are connected to the negative terminal −V of the power supply (not shown). The second transistor T5 of the second current switch has its collector 5*c* connected to the +V terminal of the power supply and its emitter 5*e* connected to the second current source CS2.

In order to program the termination circuit to either its high-impedance state or is low-impedance state, latch L1 is provided with SET and RESET inputs. The output of latch L1 is transmitted to the input I1 of AND gate A1. Data bus DB is connected by a lead 25 to the other input I2 of AND gate A1 and by a lead 26 to the base *6b* of transistor T6 of receiver circuit RC1. The output of AND gate A1 is transmitted to base *5b* of transistor T5.

The operation of the termination circuit embodiment of FIG. 4 will now be described. First, let it be assumed that the termination circuit is connected adjacent the terminal end of data bus DB. The termination circuit is programmed so as to present a relatively low impedance to data bus DB; that is, an impedance of about the same order of magnitude as the characteristic impedance of the transmission line provided by the bus and the connections and conductors of the board, card, module and chip on which receiver circuit RC1 is mounted. It will be understood that in FIG. 4 and the remaining figures of the drawing the designation "data bus DB" refers to both the bus proper and these conductors and connections. In order to program the termination circuit of FIG. 4 to its low-impedance state, the RESET input of latch L1 is activated so that the output of the latch, which is connected to input I1 of AND gate A1, is at the down level. AND gate A1 is thus not activated so that its output leading to base *5b* of transistor T5 is at the down level, thereby cutting off transistor T5 and causing the current of current source CS2 to flow entirely through transistor T4. The resulting collector current of transistor T4 flows downwardly through collector load resistor R1 so that the voltage of collector *4c* of transistor T4, and hence also the base 3b of transistor T3, are at the down level. Transistor T3 is thereby cut off so that all of the current supplied by current source CS1 flows through transitor T2. This circuit is applied to collector *2c* of transistor T2 by transistor T1 which is biased by voltage source V1 to the condutive state.

Date bus DB is normally at the lower potential level $V_L$ and rises to the upper potential level $V_H$ only when driven up by one or more drivers (usually emitter followers not shown) connected to bus DB. When the latter is at the down potential level, current flows from the positive terminal +V of the power supply down through transistor T1, transistor T2, current source CS1 and then to the negative terminal –V of the power supply. When a driver (not shown) connected to data bus DB is activated to cause the potential of bus DB to rise, the potential of emitter 1e of transistor T1 also rises so that the base-emitter junction of transistor T1 is no longer sufficiently foward-biased to maintain the-transistor in conduction and transistor T1 cuts off. Thus, instead of the current to the collector *2c* of transistor T2 being supplied by transistor T1, this current is supplied by the rising data bus DB and the energy from the bus is thereby drained therefrom and into transistor T2. The latter presents to bus DB an impedance of approximately the same order of magnitude as the characteristic impedance of the transmission line formed by data bus DB and the connections and conductors on the board, card, module and chip containing receiver circuit RC1.

Now let it be assumed that the termination circuit of FIG. 4 is connected to an intermediate portion of data bus DB so that it is desired that the termination circuit present a relatively high impedance to data bus DB. For this purpose, the termination circuit of FIG. 4 is programmed to its high-impedance state by activating the SET input to latch L1 so that the output of the latter is at the upper voltage level which is applied to input I1 of AND gate A1. The latter is still not activated because its other input I2 is connected by lead 25 to data bus DB which is assumed to be initially at the down voltage level. As one of the bus drivers (not shown) is activated to cause the potential of data bus DB to rise, this increased voltage is transmitted by line 25 to input I2 of AND gate A1 so as to activate the latter thereby causing the output of AND gate A1 to rise to its upper voltage level so as to forward-bias the base-emitter junction of transistor T5 and thereby render the latter conductive. Due to the current switch relationship between transistors T4 and T5, transistor T4 is thereby cut off due to the raised voltage level of its emitter *4e*. As a result, no collector current flows through load resistor R1, and the collector *4c* of transistor T4, and hence also the base *3b* of transistor T3, are at the upper voltage levl thereby rendering transistor T3 conductive. Because of the current switch relationship of transistors T2 and T3, transistor T2 is thereby cut off. Thus the energy of data bus DB is prevented from flowing into transistor T2 and collector *2c* of the latter presents a relatively high impedance to the bus.

FIG. 5 Embodiment

Figure 5:
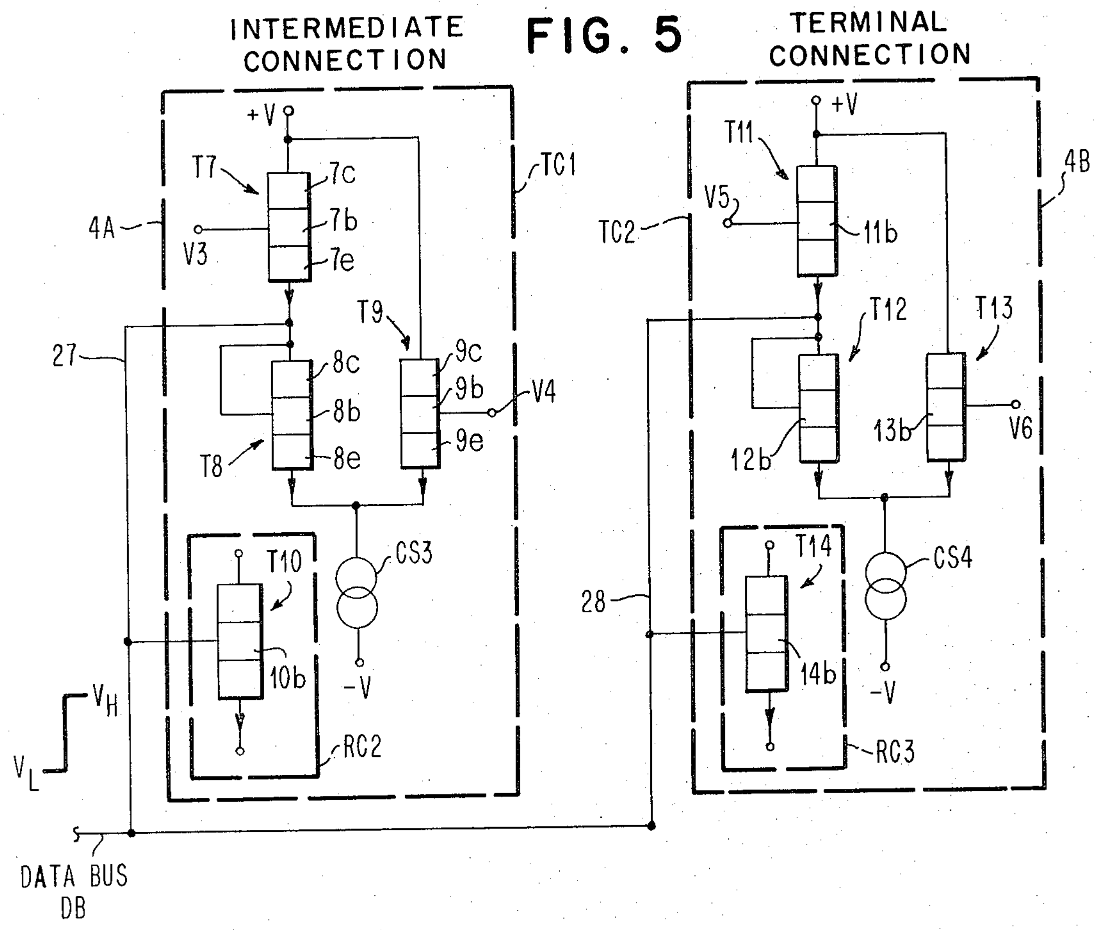
FIG. 5 is a circuit diagram showing two termination circuits, one connected to an intermediate portion of the data bus and the other connected to the end of the data bus, in accordance with another embodiment of the invention.

Referring to FIG. 5, there is shown another embodiment of the termination circuit in accordance with the present invention and wherein the diode-connected transistor is maintained entirely cut off throughout the operating cycle when the termination circuit is programmed to its high-impedance state. This obviates the necessity for AND gate A1 of FIG. 4.

Referring more specifcally to FIG. 5, there is shown a first termination circuit TC1 (together with its respective receiver circuit RC2) connected to an intermediate portion of data bus DB and a second termination circuit TC2 (and its receiver circuit RC3) connected to the end of data bus DB. Therefore termination circuit TC1 is programmed to its high-impedance state and termination circuit TC2 is prgrammed to its low-impedance state.

Termination circuit TC1 comprises a clamping transistor T7 and a current switch including a diode-connected transistor T8 and a second transistor T9. Collector *7c* of transistor T7 is connected to the positive terminal +V of the power supply (not shown), its base *7b* is connected to a voltage source V3, and its emitter *7e* is connected through lead 27 to an intermediate portion of data bus DB. Also connected to the latter is collector 8c of transistor T8 and the base *10b* of transistor T10 of the associated receiver circuit RC2. Emitter *8e* of transistor T8 is connected to the upper end of a substantially constant current source CS3 having its lower end connected to the negative terminal –V of the power supply. Also connected to the upper end of current source CS3 is the emitter *9e* of transistor T9 having its collector connected to the positive power supply terminal +V and its base *9b* connected to a voltage source V4. In order to program termination circuit TC1 to its high-impedance state, the voltage levels at V3 and V4 are such that transistor T9 is rendered conductive, transistor T8 is cut off, and the voltage at V3 is sufficiently low to enable the potential of data bus DB to be set at its lower level $V_L$. Transistor T8 thus provides a relatively high impedance to the intermediate portion of data bus DB.

Termination circuit TC2 connected to the end of data bus DB comprises a clamping transistor T11, a current switch including transistors T12 and T13, and a current source CS4. The end of data bus DB is connected by a lead 28 to the base 14*b* of transistor T14 of receiver circuit RC3. The structure of termination circuit TC2 is identical to that of termination circuit TC1 and the only difference resides in the programming voltages applied at V5 to base 11b of transistor T11 and at V6 to base 13*b* of transistor T13. More specifically, the respective potentials at V5 and V6 are such that transistor T13 is cut off, and transistors T11 and T12 are conductive. As the potential of data bus DB rises, the base-emitter junction of transistor T11 is no longer sufficiently forward-biased to maintain this transistor in conduction and it cuts off so that the current flowing downwardly through transistor T12 comes from data bus DB instead of from transistor T11. The energy of data bus DB is thereby drained into transistor T12 which presents to the bus an impedance of about the order of magnitude of the characteristic impedance of the transmission line formed by the bus and the various connections and conductors leading therefrom.

FIG. 6 Embodiment

Figure 6:
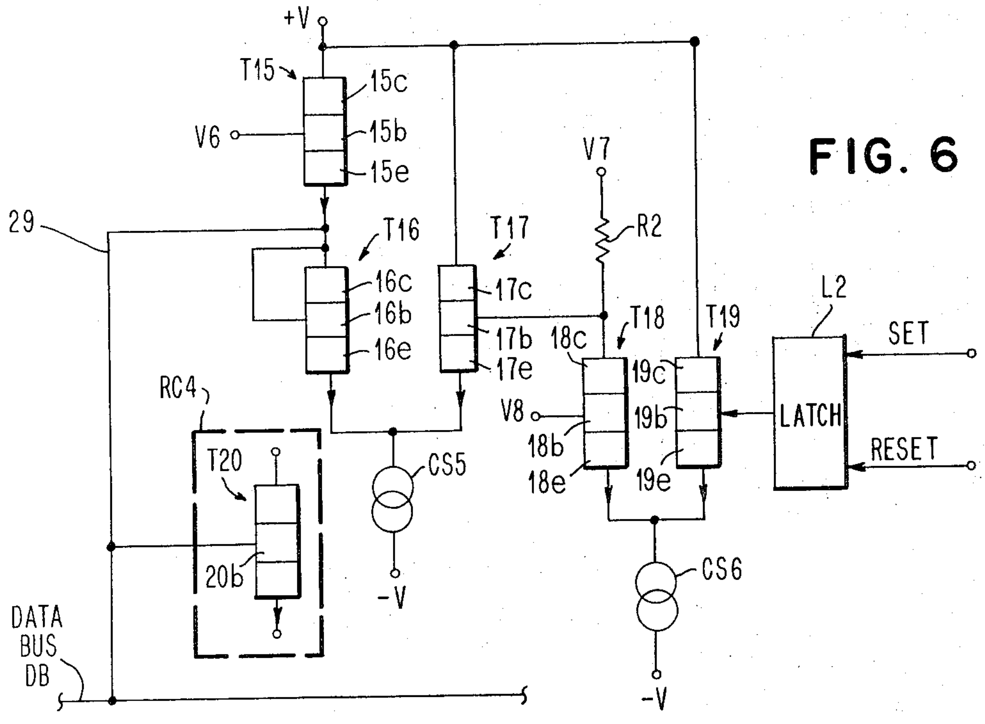
FIG. 6 is a circuit diagram showing still another embodiment of the invention similar to the embodiment of FIG. 4 except that the AND gate of the latter is omitted.

Referring now to FIG. 6, there is disclosed another embodiment of the termination circuit in accordance with the present invention and which is similar to the embodiment of FIG. 4 except for the omission of AND gate A1. More specifically, the termination circuit of FIG. 6 comprises a clamping transistor T15, a first current switch including transistors T16 and T17, and a second current switch including transistors T18 and T19. The first current switch T16, T17 is provided with a substantially constant current source CS5, and the second current switch T18, T19 is similarly provided with a current source CS6. Data bus DB is connected by a lead 29 to emitter 15*e* of transistor T15 and collector 16*c* of transistor T16. Collector 15*c* of transistor T15 is connected to the positive terminal +V of the power supply and the lower ends of current sources CS5 and CS6 are connected to negative supply terminal −V. Base 20*b* of transistor T20 of receiver circuit RC4 is also connected through lead 29 to data bus DB.

Base 15*b* of transistor T15 is connected to a voltage source V6. Base 16*b* of transistor T16 is shorted to collector 16*c*. Collector 17*c* of transistor T17 is connected to positive supply terminal +V, and its base 17*b* is connected to the lower end of a collector load resistor R2 having its upper end connected to a voltage source V7. The lower end of resistor R2 is also connected to collector 18*c* of transistor T18. Base 18*b* of the latter is connected to a voltage source V8 and emitter 18*e* of transistor T18 is connected to the upper end of current source CS6 having its lower end connected to negative supply terminal −V. Collector 19*c* of transistor T19 is connected to positive supply terminal +V and its emitter 19*e* is connected to current source CS6. Base 19*b* of transistor T19 is connected to the output of a latch L2 having SET and RESET inputs.

The operation of the embodiment of FIG. 6 is similar to that of the embodiment of FIG. 4 described above except that in FIG. 6 diode-connected transistor T16 is always maintained cut off when the latch circuit is programmed to its high-impedance state, as distinguished from the arrangement in the embodiment of FIG. 4 wherein diode-connected transistor T2 is cut off only in response to the rising potential of data bus DB. More specifcally, the termination circuit embodiment of FIG. 6 is programmed to its high-impedance state in response to the activation of the SET input of latch L2, thereby causing the output of latch L2 and base 19*b* of transistor T19 to rise to the upper voltage level so as to turn on transistor T19 and cut off transistor T18. The resulting high voltage level at collector 18*c* of transistor T18 is transmitted to base 17*b* of transistor T17 to render the latter conductive and thereby cut off diode-connected transistor T16. The nonconductive state of the latter thereby presents a relatively high impedance as seen by data bus DB.

Activation of the RESET input of latch L2 turns off transistor T19 thereby turning on transistor T18, turning off transistor T17, and turning on diode-connected transistor T16. Collector 16 *c* of conductive transistor T16 thereby presents a relatively low impedance to data bus DB; that is, an impedance of about the same order of magnitude as the characteristic impedance of the transmission line including the bus.

FIG. 7 Embodiment

Figure 7:
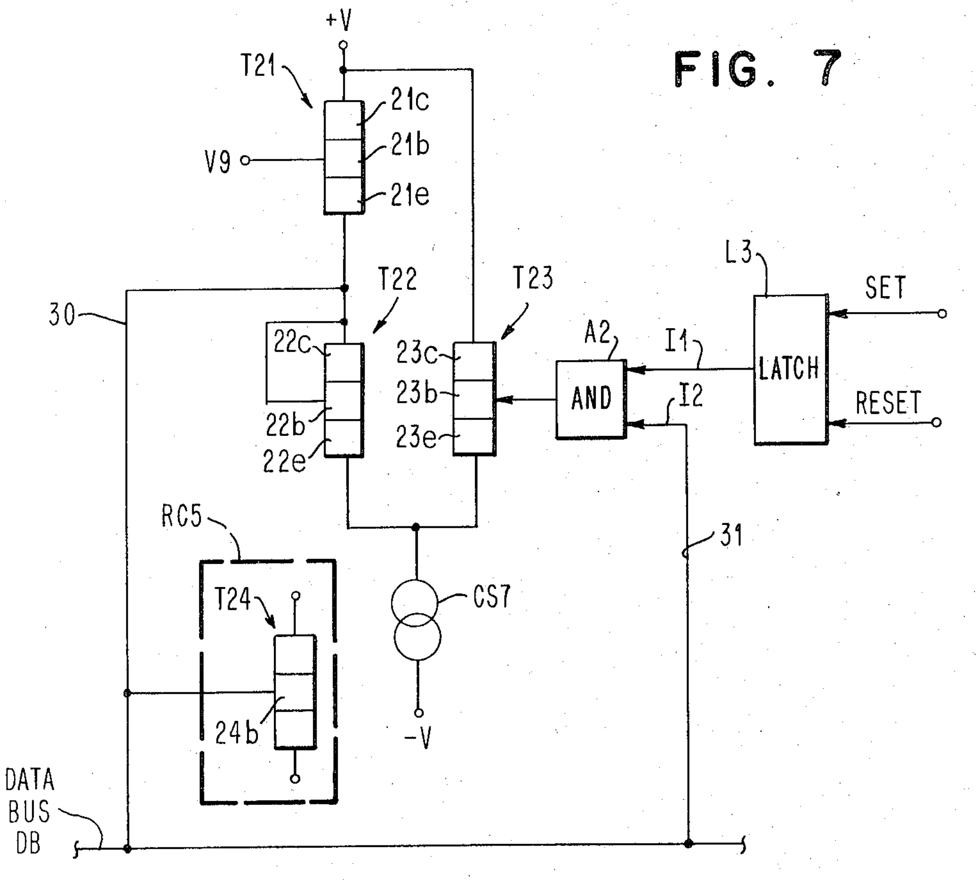
FIG. 7 is a circuit diagram showing another embodiment of the invention similar to the embodiment of FIG. 4 except that the second current switch of the latter is omitted.

Referring now to FIG. 7, there is disclosed another embodiment of the termination circuit in accordance with the present invention and which is smilar to the embodiment of FIG. 4 except for the omission in FIG. 7 of the second current switch T4, T5 of FIG. 4. In the embodiment of FIG. 7, the first current switch is driven directly by the AND gate, as will be described below.

More specifically, the embodiment of FIG. 7 comprises a clamping transistor T21 and a current switch including transistors T22 and T23, and a constant current source CS7. Collector 21*c* of transistor T21 is connected to positive supply terminal +V, its base 21*b* is connected to a voltage source V9, and its emitter 21*e* is connected through lead 30 to data bus DB. Collector 22*c* of transistor T22 is shorted to base 22*b* of the latter and is also connected to lead 30 and to emitter 21*e* of transistor T21. Lead 30 is also connected to base 24*b* of a transistor T24 of the receiver circuit RC5 corresponding to the termination circuit shown in FIG. 7.

Emitter 22*e* of transistor T22 and emitter 23*e* of transistor T23 are connected to the upper end of current source CS7 having its lower end connected to negative terminal −V of the power supply. Collector 23*c* of transistor T23 is connected by positive supply terminal +V. Base 23*b* of transistor T23 is connected to AND gate A2 having two inputs I1 and I2. The output of latch I3 is connected to input I1 of AND gate A2. The other input I2 of AND gate A2 is connected to data bus DB by a lead 31. Latch L3 is provided with SET and RESET inputs.

The termination circuit of FIG. 7 is programmed to its high-impedance state by activating the SET input of latch L3. When the SET input of latch L3 is activated, its output is at the upper voltage level which is transmitted to input I1 of AND gate A2. However, input I2 of AND gate A2 is at the lower voltage level because data bus DB is normally at its lower voltage level. Therefore, AND gate A2 is not activated and its output is at the lower voltage level, thereby turning off transistor T23 so that diode-connector transistor T22 is conductive. However, as the potential of data bus DB rises, lead 31 transmits this potential to input I2 of AND gate A2 thereby activating the latter so as to turn on transistor T23 which in turn renders transistor T22 nonconductive. Collector 22c of cut off transistor T22 thereby presents a relatively high impedance to data bus DB.

When the termination circuit of FIG. 7 is connected at the end of data bus DB, it is programmed to its low-impedance state by activating RESET input of latch L3 so that the voltage of input I1 of AND gate A2 remains at its lower level even when the potential of data bus DB rises. Transistor T23 is thereby maintained cut off and transistor T22 is maintained conductive as the potential of data bus DB rises so that the impedance presented by collector 22c of transistor T22 is relatively low and preferably of about the same order of magnitude as the characteristic impedance of the transmission line.

FIG. 8 Embodiment

Although the embodiments shown in FIGS. 4 to 7 inclusive and described above are realized with bipolar transistors, it will be understood that other amplifying devices, such as field-effect transistors, may be employed instead. As an illustrative example of one of the many different modifications and embodiments which will readily occur to those skilled in the art, there is shown in FIG. 8 an embodiment utilizing field-effect transistors and similar to the bipolar embodiments of FIGS. 5 and 6.

Figure 8:
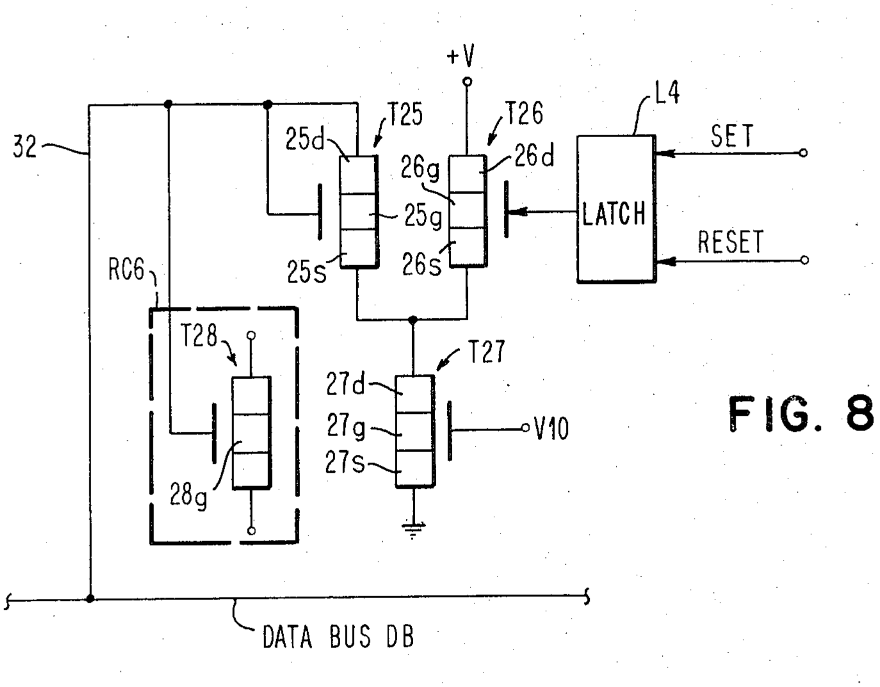
FIG. 8 is a circuit diagram showing another embodiment of the invention realized with field-effect transistors.

In FIG. 8, the termination circuit in accordance with the present invention comprises a current switch including field-effect transistors T25 and T26, and a substantially constant current source in the form of a field-effect transistor T27. The receiver circuit associated with the termination circuit is designated at RC6 and is symbolized by a field-effect transistor T28 having its gate 28g connected by a lead 32 to data bus DB. The latter is also connected by lead 32 to drain 25d and gate 25g of transistor T25. Since drain 25d and gate 25g of transistor T25 are shorted, it ill be seen that transistor T25 is diode-connected. Source 25s of transistor T25 and source 26s of transistor T26 are connected to drain 27d of transistor T27. Gate 27g of the latter is connected to a voltage source V10, and source 27s of transistor T27 is connected to ground. A latch L4 is provided with SET and RESET inputs and also an output connected to gate 26g of transistor T26. The operation of the embodiment of FIG. 8 will be obvious from the above description of the operation of the embodiments of FIGS. 5 and 6.

It will be understood that the specific embodiments shown in the drawings and described above are merely illustrative of several of the many forms which the invention may take in practice and that numerous modifications and variations of these embodiments will readily occur to those skilled in the art without departing from the scope of the invention which is delineated in the appended claims, and that the claims are to be construed as broadly as permitted by the prior art.

We claim:

1. A transmission line circuit comprising
a data output source,
a transmission line data bus connected to said source,
a terminal receiver circuit connected to a terminal end of said bus,
at least one intermediate receiver circuit connected to said bus intermediate said source and said terminal end,
a plurality of impedance means, each being switchable to either a first state wherein said impedance means has a predetermined impedance or to a second state wherein said impedance means has an impedance substantially higher than said predetermined impedance, and
signal responsive means connected to each of said impedance means for selectively switching said impedance means either said first or said second state,
one of said plurality of impedance means being switched to said first state and connected to said terminal end of said bus, and
at least one of said plurality of impedance means being switched to second state and connected to said bus proximate the point of connection of said intermediate receiver circuit.

2. The transmission line circuit of claim 1 wherein said impedance means connected to the bus are connected in parallel with said receiver circuits.

3. A circuit as set forth in claim 1 wherein each of said plurality of impedance means comprises an impedance element biased either to a conductive state to provide said predetermined impedance or to a substantially nonconductive state to provide said higher impedance.

4. A circuit as set forth in claim 2 wherein
said signal responsive means comprises means for biasing said impedance element either to said conductive state or to said substantially nonconductive state.

5. A circuit as set forth in claim 2 wherein
said impedance element comprises a diode.

6. A circuit as set forth in claim 2 wherein
said impedance means comprises a substantially constant current source,
said impedance element and said current source being connected in series.

7. A circuit as set forth in claim 2 wherein
said impedance means further comprises a transistor having an electrode,
said electrode and said impedance element being connected to said transmission line data bus.

8. A circuit as set forth in claim 7 wherein
said transistor electrode is the emitter electrode of a bipolar transistor.

9. A circuit as set forth in claim 8 wherein
said impedance element is a bipolar transistor having a collector and a base both connected to said data bus.

10. A circuit as set forth in claim 1 wherein
said impedance means comprises a current switch including a source of substantially constant current and two alternate network branches connected to said source,
said signal responsive means including means to selectively switch said substantially constant current to either one of said two alternate network branches,
said impedance means being connected to one of said two alternate network branches.

11. A circuit as set forth in claim 10 wherein
said current switch comprises a diode and a transistor,
said diode having a first electrode connected to said data bus and a second electrode connected to said current source,
said transistor having an electrode connected to said current source.

12. A circuit s set forth in claim 11 wherein
said transistor electrode is the emitter electrode of a bipolar transistor.

13. A circuit as set forth in claim 11 wherein
said transistor electrode is the source electrode of a field-effect transistor.

14. A circuit as set forth in claim 11 wherein
said transistor has an input electrode,
said signal responsive means being connected to said input electrode.

15. A circuit as set forth in claim 14 wherein
said transistor input electrode is the base electrode of a bipolar transistor.

16. A circuit as set forth in claim 14 wherein
said transistor input electrode is the gate electrode of a field-effect transistor.

17. A circuit as set forth in claim 1 and comprising signal input means for receiving an input signal,
said signal responsive means including means for selectively switching said impedance means to either of said two states thereof in response to both said input signal and the voltage level of said data bus.

18. A circuit as set forth in claim 17 wherein
said signal responsive means comprises a logic gate having two inputs and an output,
first means connecting said signal input means to one of said logic gate inputs,
second means connecting said data bus to the other of said logic gate inputs, and
third means connecting said logic gate output to said impedance means for selectively switching the latter to either of said two states thereof in response to the voltage level of said logic gate output.

19. A circuit as set forth in claim 18 wherein said logic gate is an AND gate.

20. A circuit as set forth in claim 18 wherein said third means comprises a current switch.

21. A circuit as set forth in claim 18 wherein said first means comprises a latch circuit.

22. As circuit as set forth in claim 1 wherein each of said plurality of impedance means comprises a diode biased either to a conductive state to provide said predetermined impedance or to a substantially nonconductive state to provide said higher impedance,
said signal responsive means comprising means for biasing said diode either to said conductive state or to said substantially nonconductive state,
said impedance means further comprising a substantially constant current source,
said diode and said current source being connected in series,
said impedance means further comprising a transistor having an electrode,
said electrode and said diode being connected to said transmission line data bus.

23. A circuit as set forth in claim 22 and comprising signal input means for receiving an input signal,
said signal responsive means including means for selectively switching said impedance means to either of said two states thereof in response to both said input signal and the voltage level of said data bus, said signal responsive means comprising a logic gate having two inputs and an output,
first means connecting said signal input means to one of said logic gate inputs,
second means connecting said data bus to the other of said logic gate inputs, and
third means connecting said logic gate output to said impedance means for selectively switching the latter to either of said two states thereof in response to the voltage level of said logic gate output.

24. A circuit as set forth in claim 22 wherein
said impedance means comprises a current switch including said source of substantially constant current and two alternate network branches connected to said source,
said transistor and said diode constituting one of said branches,
said signal responsive means including means to selectively switch said substantially constant current to either one of said two alternate network branches,
said current switch comprising a second transistor constituting the other of said branches,
said diode having a first electrode connected to said data bus and a second electrode connected to said current source,
said second transistor having an electrode connected to said current source,
said second transistor having an input electrode,
said signal responsive means being connected to said input electrode.

25. A circuit as set forth in claim 24 and comprising signal input means for receiving an input signal,
said signal responsive means including means for selectively switching said impedance means to either of said two states thereof in response to both said input signal and the voltage level of said data bus, said signal responsive means comprising a logic gate having two inputs and an output,
first means connecting said signal input means to one of said logic gate inputs,
second means connecting said data bus to the other of said logic gate inputs, and
third means connecting said logic gate output to said second transistor input eletrode for selectively switching the current switch in response to the voltage level of said logic gate output.

26. A circuit as set forth in claim 25 wherein said first-recited transistor electrode is an emitter electrode, said second transistor electrode is an emitter electrode, and said second transistor input electrode is a base electrode.

* * * * *